3,362,531
METHOD OF SEPARATING CATALYST PARTICLES INTO FRACTIONS OF DIFFERING SURFACE AREA
Marvin F. L. Johnson, Homewood, Joseph E. Willis, Harvey, and Robert A. Sanford, Homewood, Ill., assignors to Sinclair Research, Inc., New York, N.Y., a corporation of Delaware
No Drawing. Filed Oct. 29, 1964, Ser. No. 407,532
6 Claims. (Cl. 209—19)

This invention pertains to a method for removal of low-activity fractions from a mass of finely divided catalyst particles. The invention employs the "sink-float" method for separating catalyst particles which are of subnormal surface area. In the invention, the catalyst particles to be treated are contacted with an organohalosilane or silicone and then with a heavy, aqueous solution of an inorganic salt to float off catalyst particles of satisfactory surface area, leaving relatively inactive particles to be discarded and replaced by fresh, more active catalyst.

Fluid catalytic cracking systems are employed in the petroleum industry to convert high boiling petroleum fractions, e.g., those generally considered to be "gas oils," to gasoline or gasoline blending components which boil at a lower temperature. The gas oil, usually in the vapor form, is contacted with a solid oxide catalyst at temperatures of about 700–950° F. and usually in the absence of added hydrogen. Fluidized cracking systems employ as a catalyst a fine powder, generally having about 50 to 95% or more of its particles able to pass through a 100-mesh screen. Gases and vapors to be contacted with the catalyst ordinarily are fed into the bottom of a bed of the catalyst and at such a rate that there is no clear interface between the bed and the space above it. Fluid catalytic cracking systems generally include apparatus for transferring the catalyst from the cracking zone, where gasoline is produced and from which gasoline and other effluent vapors are removed, to a regeneration zone where the catalyst is contacted with air or other oxygen-containing gas to burn carbon off the catalyst particles. Often compressed gas is used to carry the catalyst to the regeneration zone and, after regeneration to a lower carbon content condition, back to the cracking zone. Usually the cracking, transferring and regenerating systems are operated on a continuous basis and the rubbing of catalyst particles against each other results in attrition of many catalyst particles to sizes smaller than the original particles. The smallest of these, the fines, often pass out of the cracking system with the effluent gases and ordinarily are replaced with fresh "virgin" catalyst. Also a deterioration of other catalyst properties with continued use often leads the operator to deliberately remove small amounts of catalyst at regular intervals or continuously from the cracking system, these amounts also being replaced by virgin catalyst to give an "equilibrium catalyst" mixture having an average of properties favorable for the cracking results desired.

The catalyst materials most widely used today are predominantly silica. These silica-based catalysts usually, for best cracking results, contain another inorganic oxide such as alumina or magnesia. Most cracking catalysts contain about 10 to 60%, often about 10–40% alumina, the essential balance being silica. Catalysts made from certain clays are still used to some extent in catalytic cracking. The manufacturing procedure for such products generally involves a severe acid treatment of the clay to remove essentially all materials but silica and alumina or magnesia. The acid treatments also often change the proportions of silica and alumina in the material and this usually disturbs the ordered crystalline nature of the clay, serving to give a more active catalyst.

Increasing sophistication in catalyst manufacture has made synthetic fluid cracking catalysts dominant in commercial installations. These catalysts are often primarily amorphous materials, without an ordered pattern for their molecular components. The siliceous catalyst may be all or partly crystalline, for instance, a crystalline aluminosilicate of controlled pore size. Although some of the synthetic gel, silica-based catalysts may be semi-synthetic, that is, partly of acid-activated clay with which amorphous gel or crystalline components are mixed or on which synthetic silica, alumina or silica-alumina is deposited, completely synthetic materials are usually favored. Such catalysts have, in general, fewer impurities which might deactivate the catalyst or give exaggerated quantities of undesired products in use.

Synthetic gel catalysts may be produced by precipitating hydrous alumina or silica from solutions of aluminum and/or silicon-containing compounds. Sometimes alumina and silica are precipitated simultaneously, sometimes sequentially, from the same or different solutions. Sometimes one is precipitated in the presence of the other; sometimes the precipitates themselves are combined in the proportions desired. The hydrogel precipitate is removed from supernatant solute and eventually provided in a washed, dried and finely divided state.

As mentioned, the activity of a cracking catalyst does not remain at its "virgin activity" but rather declines with use, and since commercial operators of cracking systems desire to maintain a certain level of activity in the system, a proportion of catalyst in the cracking system is, conventionally, periodically removed and replaced with virgin catalyst to give an improved equilibrium activity. The removed catalyst is generally discarded, but the fact remains that there is a wide spectrum of activities of the numerous catalyst particles in the discard. Thus, catalyst discard will include much active catalyst, while much relatively inactive catalyst remains in the unit.

In this invention, such catalyst particles are sorted into a more active fraction and a less active fraction. The more active fraction may be sent to the cracking system while the less active may be discarded. The invention is generally practiced on equilibrium, used, catalyst withdrawn from an operative system, but it also may be practiced, perhaps with some modifications, on virgin catalyst to avoid sending less active or readily deactivatable particles to the system in the first place. With a discard only of the less active portions of equilibrium catalyst from the system, a great saving in make-up catalyst can be obtained.

The activity of a catalyst, while not depending entirely on the amount of surface area of the catalyst, is nonetheless intimately bound with the extent of catalyst surface, since cracking reactions have been found, for the most part, to take place at the catalyst surface. For a given catalyst the activity will generally vary directly with the amount of surface, as measured, usually, in square meters per gram. The surface area of a catalyst, of course, is associated with the structure of the surface which usually is a net of capillaries and pores. The method of this invention is based on differences in the total pore volumes of the relatively active and relatively inactive catalyst particles, and involves coating the particles first with an organohalosilane or silicone and then subjecting the mass of coated particles to a heavy, aqueous liquid having a density sufficient to float out the particles of satisfactory, i.e. greater, pore volume and surface area.

A number of liquid or liquefiable organo-halo-silane materials are available for use in the process of this invention. These materials are usually of the general formula:

where R is a hydrocarbon group of up to about 18 or more carbon atoms, preferably 1 to about 8 carbons, X is halogen and Z is R or X. The hydrocarbon of the formula can be saturated or unsaturated alkyl (straight or branched chain or cyclic) or aryl, preferably mono cyclic, e.g., phenyl, and can have substituents which do not interfere with the properties of the silane or leave a harmful residue on the catalyst particles. Examples of non-interfering substituents are alkyl and hydroxyl groups. The halogen X in the general formula is preferably of atomic number 17 to 53, i.e. chlorine, bromine and iodine. Particularly preferred is chlorine.

Illustrative of organosilanes contemplated for use in the present invention are methyltrichlorosilane, ethyl trichlorosilane, butyltrichlorosilane, methyltribromosilane, propyltribromosilane, butyltribromosilane, methyltriiodosilane, ethyltriiodosilane, propyltriiodosilane, butyltriiodosilane, diphenyldichlorosilane, diphenyldibromosilane, dicresyldichlorosilane, di (ethylphenyl) dichlorosilane, phenyltrichlorosilane, phenyltribromosilane, phenyltriiodosilane, cresyltrichlorosilane and the like.

The silicone resins usable in the instant invention are normally liquid or at least liquefiable by heating to a moderate temperature or by solution in a suitable solvent and have the structure

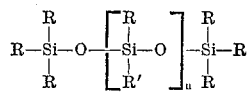

where R and R' are hydrocarbon groups as described above and $n$ is a whole number sufficient to meet the liquefiable specifications set out above. These are commercially available and are made by procedures known to the art.

Among the materials preferred for use in this invention is dimethyldichlorosilane, but other silanes having 1-3 halogen substituents and 1-3 hydrocarbon substituents may be employed. The halogen is usually of atomic number 17-35, that is, chloro or bromo, and the hydrocarbon radical is of fairly low molecular weight, say of about 1-8 carbon atoms, and includes aromatic as well as alkyl materials. Phenyltrichlorosilane, trichlorophenylsilane, methyltrichlorosilane, trimethylchlorosilane, etc., are readily available materials and organohalosilane derivatives such as the above-mentioned silicone resins may also be employed. Thus the polymerized hydrolysis product of dimethyldichlorosilane can act as an efficient coating agent.

The organohalosilane or silicone is applied to the catalyst in an amount sufficient to give a preferably distinct sink-float separation in the later phase of the process. Usually this separation will float out particles having an average of at least about 5 square meters per gram more surface area than the sinkers. Preferably the sinkers and floaters will differ by an average surface area of at least about 10 m.²/g.

The organohalosilane or silicone is usually applied to the catalyst by immersing the catalyst in a solution of the silane or silicone in a convenient solvent, for instance, benzene or carbon tetrachloride. Impurities which would leave a deposit on the catalyst harmful in its further use are, of course, avoided. Silicones are usually commercially obtained as a solution in a petroleum distillate fraction and where a solution of proper low viscosity is selected, the commercial silicone fluid may be used for immersion of the catalyst. After immersion, the solvent may be evaporated or otherwise removed, leaving sufficient organic silicone compound on the catalyst to insure the desired separation. Often the silane or silicone will comprise about 3–25% by weight of the catalyst. The best separation results appear to accrue from use of greater proportions of the silane or silicone, say at least about 5%. At the present time, 15% appears to be the upper limit of economic feasibility for silane content. Attempts to coat the catalyst particles with silane by introduction of silane vapor into a bed of the particles have produced inferior results. The coated particles are subjected to the action of an aqueous inorganic salt solution having a density intermediate the heavy and light coated-catalyst particles to be separated from each other. Often this density will be about the heaviest obtainable with an aqueous solution of a particular salt. The density will usually be between about 1 and 2 gms./cc., preferably about 1.2 to 2 gms./cc. The salt selected is usually one which does not leave a harmful residue on the catalyst and, in the case of silica-alumina cracking catalysts, a soluble aluminum salt which decomposes to volatile materials and alumina may be employed. Aluminum acetate and aluminum nitrate are such solutes. The aqueous inorganic salt solution is brought in contact with the coated catalyst particles under flotation conditions, that is, under conditions conducive to gravitational separation. Preferably, the separation employs centrifugal force.

It may sometimes be advisable to insure prevention of silane or silicone entry into the pores of the catalyst by filling the pores with a liquid before silicone compound impregnation. When such liquids are employed, they should be volatizable under the conditions of silane solvent removal and also, preferably, they should be immiscible with the silane or silane derivative solvent. Nitromethane is a suitable liquid as are acetone and even, in many situations, water. The impregnation of the catalyst with liquids miscible with the silane solvent does not seem to produce the best results.

The following examples of the use of the process of this invention are to be considered illustrative only and not limiting.

The origin of the catalyst samples used in the example is as follows. Samples 57 and 64 were portions of batches taken at different times from a commercial catalytic cracking operation. This equilibrium catalyst contained about 13% $Al_2O_3$ and 87% $SiO_2$. Sample 05 was a high (25%) alumina, synthetic silica-alumina cracking catalyst removed from another commercial catalytic cracking operation. The portions of each catalyst employed were those which passed through a 100 mesh sieve and which had been treated to remove magnetic particles and calcined in air for 3 hours at 1050° F. to insure removal of carbon deposits.

In Examples I, II and III, solutions of dimethyldichlorosilane (DMDC) in carbon tetrachloride were prepared and three portions of Sample 57 catalyst were slowly poured into each solution while being rapidly stirred. The solution was allowed to slowly evaporate and then additional solvent was removed by placing each sample under vacuum for a day or so. Samples I, II and III contained a nominal 4, 6 and 8% of the silane respectively. After this, each treated catalyst was suspended in a saturated aqueous solution of $Al(NO_3)_3$ and centrifuged at 1000 r.p.m. Each fraction was filtered, washed, dried and calcined and the specific surface areas determined by the BET method. Sample I, containing about 4% DMDC had 67.7% floaters and 32.3% sinkers. The area of the floaters was 128 m.²/gm. while the sinkers had 121 m.²/gm. Sample II, impregnated with about 6% DMDC, had 90.6% floaters of 135 m.²/gm. and 9.4% sinkers of 67 m.²/gm. Sample III had 93.8% floaters of 134 m.²/gm. and 6.2% sinkers of 73 m.²/gm. These results are compiled below in Table I.

Example IV

To a portion of catalyst sample 64 was added a solution of phenyltrichlorosilane (PTC) in carbon tetrachloride, while the catalyst was being rapidly stirred. The solution was of a concentration sufficient to deposit 6.5 weight percent organohalosilane on the catalyst. After stirring for several minutes, the liquid was allowed to evaporate. The catalyst was then placed under vacuum to remove the last trace of solvent. After this the treated catalyst was suspended in an aqueous $Al(NO_3)_3$ solution (density =1.394 gm./ml.) and centrifuged at 1000 r.p.m. The desired fractions were filtered, washer, dried, and calcined. Specific surface areas determined by the BET method were 136 m.$^2$/gm. and 126 m.$^2$/gm. for the floating fraction (43.1% of the total) and the sinking fraction (56.9% of the total), respectively.

Example V

Another portion of catalyst sample 64 was impregnated with hexane before addition of a PTC solution as in Example IV to the same silane percentage. The hexane is miscible with the $CCl_4$ solvent and evaporated with the solvent. Separation by the procedure in Example IV and measurement of the specific surface areas gave an area of 130 m.$^2$/gm. for the floating fraction (65.4% of the total) and 122 m.$^2$/gm. for the sinking fraction (34.6% of the total).

Example VI

Another portion of catalyst sample 64 was impregnated with nitromethane, a liquid immiscible with $CCl_4$, to prevent entry of the phenyltrichlorosilane into the pores. It was then treated with PTC solution as in Example IV and centrifuged. Specific surface areas of 135 m.$^2$/gm. and 115 m.$^2$/gm. were obtained for the floating fraction (74.7% of the total) and the sinking fraction (25.3% of the total), respectively.

Example VII

To a bed of catalyst sample 64, fluidized with dry, $CO_2$-free air, was introduced the vapor of dimethyldichlorosilane diluted by nitrogen. The contact time was about 1.5 hours, during which time 4.2 weight percent DMDC silane was admitted to the reactor. The treated catalyst was suspended in an aqueous $Al(NO_3)_3$ solution (density—1.392 gm./ml.) and centrifuged at 1000 r.p.m. The desired fractions were filtered, washed, dried, and calcined. The floating fraction comprised 21% of the total; the sinking fraction, 79%.

Example VIII

A stirred bed of catalyst sample 64 was exposed to undiluted vapors of dimethyldichlorosilane. The vessel containing the catalyst was closed, with the liquid DMDC silane suspended in a glass bucket above the catalyst; the amount of DMDC silane used was equivalent to 5.0% based on catalyst weight, with the evaporation requiring several hours. The treated catalyst was suspended in an aqueous $Al(NO_3)_3$ solution (density—1.382 gm./ml.) centrifuged at 1000 r.p.m. The fractions were filtered, washed, dried, and calcined; floaters comprised 98.3% of the total, with sinkers comprising 1.7%.

The results from these examples is given in the Table I below.

TABLE I

| Sample | Catalyst | Silane Used | Percent | Addition Type | Density $Al(NO_3)_3$ | Floaters Percent | Floaters Area (m.$^2$/gm.) | Sinkers Percent | Sinkers Area (m.$^2$/gm.) |
|---|---|---|---|---|---|---|---|---|---|
| I | 57 | DMDC | ~4 | Solution | 1.376 | 67.7 | 128 | 32.3 | 121 |
| II | 57 | DMDC | ~6 | do | 1.381 | 90.6 | 135 | 9.4 | 67 |
| III | 57 | DMDC | ~8 | do | 1.381 | 93.8 | 134 | 6.2 | 73 |
| IV | 64 | PTC | 6.5 | do | 1.394 | 43.1 | 136 | 56.9 | 126 |
| V | 64 | PTC | 6.5 | do | 1.394 | 65.4 | 130 | 34.6 | 122 |
| VI | 64 | PTC | 6.5 | do | 1.392 | 74.7 | 135 | 25.3 | 115 |
| VII | 64 | DMDC | 4.2 | Vapor | 1.392 | 21.0 | | 79.0 | |
| VIII | 64 | DMDC | 5.0 | do | 1.392 | 98.3 | | 1.7 | |

Examples IX to XI

In these examples, portions of catalyst 05 which had an area of 148 m.$^2$/gm. were coated with silicone resin by use of "Dow Corning 200 Fluid" a mineral spirit solution of methyl silicone polymer having a viscosity grade of 20. The solution was added to the catalyst samples without further purification and after evaporation of the solvent each sample was subjected to separation effected by suspension in saturated aqueous $Al(NO_3)_3$ solution, followed by centrifugation at 1000 r.p.m. All fractions were washed, over-dried and calcined at 1050° F. the results are given in Table II below.

TABLE II

| Example | Percent Silicone | Floaters Percent | Floaters Area | Sinkers Percent | Sinkers Area |
|---|---|---|---|---|---|
| IX | 2 | 33 | 152 | 67 | 152 |
| X | 5 | 87.5 | 155 | 12.5 | 119 |
| XI | 10 | 91 | 160 | 9 | 114 |

It is apparent from these results that the method of this invention, which includes coating of catalyst particles with an organohalo silane or silicone and gravitational separation by means of a heavy inorganic salt aqueous solution can provide for an excellent separation of a catalyst into active and inactive portions as determined by their surface area.

It is claimed:
1. A method for separating silica-based cracking catalyst into fractions of differing surface area which comprises impregnating the particles of said catalyst with a volatile liquid, coating said particles with a liquid material comprising a solvent immiscible with said volatile liquid and a member selected from the group consisting of organohalosilanes having 1–3 halogen substituents and 1–3 hydrocarbon substituents each of 1–18 carbon atoms, and petroleum distillate-soluble silicone resins derived therefrom, removing said volatile liquid and said solvent and subjecting the mass of particles to an aqueous solution of an inorganic salt, the amount of said selected liquid material and the density of said aqueous solution being sufficient to effect flotation of a first fraction of said catalyst, said first fraction having an average surface area at least about 5 square meters per gram greater than the average surface area of the second, non-floating fraction.
2. The method of claim 1 wherein the coated particles contain about 5 to 15% of the said selected member.
3. The method of claim 1 wherein said aqueous solution has a density of about 1–2 grams/cc.
4. The method of claim 1 wherein said selected member is dimethyl dichloro silane.
5. The method of claim 4 wherein the aqueous solution is a solution of $Al(NO_3)_3$.

6. The method of claim 1 wherein the selected member is a silicone resin having the structure

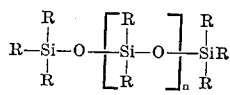

where R is a hydrocarbon group of up to about 18 carbon atoms and $n$ is a whole number sufficient to provide a liquid or liquefiable resin soluble in petroleum distillate.

References Cited

UNITED STATES PATENTS

| | | | |
|---|---|---|---|
| 2,643,215 | 6/1953 | Hoge | 209—173 X |
| 2,832,470 | 4/1958 | Rietema | 209—172.5 X |
| 2,991,878 | 7/1961 | Gray | 209—172.5 X |
| 3,223,474 | 12/1965 | Nitzsche | 260—448.2 X |

FRANK W. LUTTER, *Primary Examiner.*